(12) United States Patent
Yuan

(10) Patent No.: US 7,228,005 B1
(45) Date of Patent: Jun. 5, 2007

(54) ADAPTIVE WIENER IMAGE RESTORATION KERNEL

(75) Inventor: Ding Yuan, Henderson, NV (US)

(73) Assignee: National Security Technologies, LLC, Las Vegas, NV (US)

( * ) Notice: Subject to any disclaimer, the term of this patent is extended or adjusted under 35 U.S.C. 154(b) by 872 days.

(21) Appl. No.: 10/462,414

(22) Filed: Jun. 16, 2003

Related U.S. Application Data

(60) Provisional application No. 60/389,650, filed on Jun. 17, 2002.

(51) Int. Cl.
*G06K 9/36* (2006.01)
*G06K 9/40* (2006.01)

(52) U.S. Cl. .................................... 382/280

(58) Field of Classification Search ................ 382/250, 382/254, 260–264, 270–272, 276, 280; 348/342, 348/374; 359/558, 559, 560, 900
See application file for complete search history.

(56) References Cited

U.S. PATENT DOCUMENTS

| | | | | |
|---|---|---|---|---|
| 5,414,782 | A * | 5/1995 | Carasso | 382/270 |
| 5,694,484 | A * | 12/1997 | Cottrell et al. | 382/167 |
| 6,285,799 | B1 * | 9/2001 | Dance et al. | 382/261 |
| 6,819,361 | B1 * | 11/2004 | Lee et al. | 348/342 |
| 6,972,905 | B2 * | 12/2005 | Ludwig | 359/559 |

* cited by examiner

*Primary Examiner*—Amir Alavi
(74) *Attorney, Agent, or Firm*—Robert Ryan Morishita; Morishita Law Firm, LLC

(57) ABSTRACT

A method and device for restoration of electro-optical image data using an adaptive Wiener filter begins with constructing imaging system Optical Transfer Function, and the Fourier Transformations of the noise and the image. A spatial representation of the imaged object is restored by spatial convolution of the image using a Wiener restoration kernel.

42 Claims, 9 Drawing Sheets

ADAPTIVE WIENER IMAGE RESTORATION KERNEL

RELATED APPLICATION DATA

The present application claims the priority of U.S. Provisional Application Ser. No. 60/389,650, entitled "Adaptive Wiener Image Restoration Kernel," filed Jun. 17, 2002 by Applicant herein.

GOVERNMENT LICENSE RIGHTS

The U.S. Government has a paid-up license in this invention and the right in limited circumstances to require the patent owner to license others on reasonable terms as provided for by the terms of DOE-AC08-96NV11718 awarded by the United States Department of Energy.

FIELD OF THE INVENTION

The present invention relates to the restoration of image data acquired by electro-optical imaging systems. More specifically, the present invention is a new adaptive Wiener filtering algorithm for image data.

BACKGROUND OF THE INVENTION

In any imaging system, from desktop scanners to remote sensing systems, the basic process is the same: signals from the object mixed with noises are quantized to form the image of the object. An imaging system may be conceptually viewed as a spatial convolution filter that acts on the true signals of objects and outputs the altered signals stored in an image. This spatial filter is the system Point Spread Function (PSF), which is the combined result of the system electro-optical characteristics and scanner motions. If the noise terms are assumed to be unrelated to the system and the object, then the process of remote sensing can be characterized by a so-called image equation:

$$I = PSF \otimes O + N$$

Where $\otimes$ is the convolution operator. In this rather simplified image equation, the term I is the quantity directly measured by the imaging system and recorded in an image, O is the quantity to measure and is related to I through the known deterministic PSF and the unknown random noise term N. The process of resolving O from the observation I is often called image restoration or image reconstruction.

If both object and image are represented in the same coordinate system (x, y), this object-image relationship can be further expressed by a spatial integral:

$$g(x, y) = \int_{-\infty}^{\infty} \int_{-\infty}^{\infty} h(x-\xi, y-\eta) f(\xi, \eta) d\xi d\eta + n(x, y)$$

where
  f(x, y) is the spatial representation of the true object, or O=f(x, y)
  g(x, y) is the spatial representation of the image, or I=g(x,y)
  h(x, y) is the PSF of the imaging system
  n(x, y) is the noise function of the imaging system As stated above, the task of restoration is to "invert" the imaging process and restore the original object f(x, y), based on the measurement g(x, y) and knowledge about the system PSF and the noise term. However, f(x, y) is not known and could never be completely restored. Therefore, the practical task has been shifted to finding an estimate $\hat{f}(x,y)$ for f(x, y), such that it satisfies certain restrictions and optimal criteria.

Restoration of the observed image to the original object truth can be handled by the increasingly popular spatial convolution approaches. The centerpiece of the spatial convolution technique is a spatial filtering kernel, referred to hereafter as a restoration kernel, r(x, y); the estimation $\hat{f}(x,y)$ of f(x, y) is calculated through the spatial convolution of the image g(x, y) and the kernel r(x, y):

$$\hat{f}(x,y) = g(x,y) \otimes r(x,y)$$

The restoration kernel r(x, y) is often required to satisfy certain restrictions, such as non negativity ($r(x,y) \geq 0$), and/or normality ($\int \int r(x,y) = 1$). As the restoration kernel is key to the restoration of an image, there is a need in the art for building a restoration kernel that is particularly suited to specific applications.

The Fourier transform is a powerful tool for handling equations involving convolution and correlation. By applying the Fourier transform on both sides of the image equation, and using the convolution property of the Fourier transform, the following is provided:

$$F[g(x,y)] = F[h(x,y)] \cdot F[f(x,y)] + F[n(x,y)]$$

or, the equivalent image equation in the Fourier frequency domain:

$$G(u,v) = H(u,v) \cdot F(u,v) + N(u,v)$$

where G(u,v), H(u,v), F(u,v) and N(u,v) are the Fourier transforms of g(x,y), h(x,y), f(x,y) and n(x,y). In principle, both image equations in the spatial and the frequency domains are equivalent, since the solution for one equation can be derived from the solution for the other, either through Fourier transform or Inverse Fourier transform.

Likewise, the spatial convolution restoration equation:

$$\hat{f}(x,y) = g(x,y) \otimes r(x,y)$$

can be written in Fourier frequency domain:

$$\hat{F}(u,v) = G(u,v) \cdot R(u,v)$$

where $\hat{F}(u,v)$, G(u,v) and R(u,v) are the Fourier transforms of $\hat{f}(x,y)$, g(x,y) and r(x,y) respectively.

In consideration that H(u,v) may be zero for some frequencies, and N(u,v) can be significantly different from zero, the conventional Wiener approach looks for a filter function w(x,y), and an estimate function $\hat{f}(x,y)$ such that:

$$\hat{f}(x,y) = g(x,y) \otimes w(x,y)$$

and $$E\left[\left(f(x, y) - \hat{f}(x, y)\right)^2\right] = \min_{\gamma} E[(f(x, y) - g(x, y) \otimes r_s(x, y))^2] = \varepsilon^2$$

where $\{r_s(x,y)\}$ is the set of all possible linear stationary restoration filters. In this expression, the expectation E should be understood as an average over all instances of the random noise field n(x,y) and over the whole (x,y) space where f(x,y) has definition.

Let W(u,v) be the Fourier transform of w(x,y), and assuming that the scene (object), the image, noise and filters are stationary, it can be proven that:

$$W(u, v) = R_{Wiener}(u, v) = \frac{H^*(u, v)}{|H(u, v)|^2 + S_n(u, v)/S_f(u, v)}$$

or $$W(u, v) = \frac{1}{H(u, v)} \frac{|H(u, v)|^2}{|H(u, v)|^2 + S_n(u, v)/S_f(u, v)}$$

where $S_n(u,v)=S_{nn}(u,v)$ is the noise power spectrum, and $S_f(u,v)=S_{ff}(u,v)$ is the scene (object) power spectrum. The ratio $S_n(u,v)/S_f(u,v)$ can be viewed as a system noise-signal ratio. It can be shown that the modulus and phase of the Wiener filter are such that the Wiener filter is an inverse phase filter and a modified direct inverse modulus filter. It effectively controls the noise enhancement of the inverse filter. Additionally, the Wiener filter is a bounded filter. Because of this property, the Wiener restoration kernel has become more acceptable in image processing.

One prior art approach is by L. Wood for Landsat remote sensing data. In her 1986 dissertation entitled "Restoration for Sampled Imaging System," incorporated herein by reference, Wood proposed a Wiener kernel construction approach for restoring Landsat Multispectral Scanner (MSS) data. Wood's approach has a number of weaknesses.

(1) A key assumption in Wood's approach is total separability. That is, every single component in the expression of the Wiener kernel is separable for x and y. However, even if all Wiener filter components are separable, it does not necessarily follow that W(u,v) is separable. To overcome this difficulty, the approach assumes that the Wiener filter itself is separable. This total separability assumption results in a suboptimal solution because a kernel defined this way is only an approximation of the true Wiener solution.

(2) Wood requires a number of estimations and assumptions to be made that may not hold true for all applications. For example, Wood's approach replaces the object power spectrum $S_f(u,v)$ using the image power spectrum $S_g(u,v)$. This manipulation may create some problems, because this manipulation implicitly assumes that the system noise-to-scene (or object) ratio is: $1-H^2(u,v)$, which may not always hold true (3) Wood's approach is strongly model dependent. For instance, the forms of the Optical Transfer Functions ("OTFs") of the optical, detector, and the electro-filtering systems were assumed to satisfy respective separable mathematical models. The autocorrelation function of the object was assumed to satisfy an exponential function; the noise power spectrum of the noise was assumed to be one. The optimal nature of the derived filter can degenerate because so many specific function forms were hypothesized, especially the auto-correlation function of ground truth.

(4) Wood's approach relied on a particular scene and, therefore, it is not quite adaptive.

Thus, it can be seen that there is a need in the art for a new adaptive Wiener filtering algorithm for image data.

SUMMARY OF THE INVENTION

The present invention is a method and device for restoration of general image data collected by electro-optical imaging systems. Image data may include, but not limited to, scanner images, fax images, medical images, and remote sensing images to restore data such as airborne remote sensing data for the detection of small weak anomalies.

The method begins by acquiring image of an object in a common coordinate system. The imaging system is assumed to satisfy the following conditions:

(a) That the imaging system is an additive systems for the signals from the object and noises from other sources, and the noise component and the object component are independent of each other.
(b) That the Point Spread Function (PSF) of the imaging system is known, stationary, and can be reconstructed from the system Modulation Transfer Function (MTF).
(c) That if PSF needs to be constructed from MTF, then PSF is further assumed to be a separable function in x and y directions, and the Optical Transfer Function (OTF) has continuous derivatives.
(d) That the noise component is stationary.

These assumptions are generally acceptable for most imaging systems.

Additionally, it is assumed that the image and the object are referenced using the same x-y coordinate system, and the image data is recorded in the first quadrangle of the x-y coordinate system. The image can be expanded to the other quadrangles on the same coordinate plan through symmetric extensions. Notice that this assumption can always be satisfied through appropriate planar system translation.

The restoration kernel in the Fourier frequency domain is built based on the above assumptions, the Wiener filtering theory, and using the following relationship:

$$W(u, v) = \frac{1}{H(u, v)}\left(1 - \frac{N^2(u, v)}{G^2(u, v)}\right)$$

The corresponding restoration kernel in the spatial domain can be calculated from the Fourier inverse of the frequency domain kernel:

$$w(x,y)=F^{-1}[W(u,v)]$$

The restoration f̂(x,y) of the image f(x,y) can be achieved through spatial convolution:

$$\hat{f}(x,y)=g(x,y)\otimes w(x,y)$$

The method of the present invention may be implemented using software, hardware, firmware, or the like. A device implementing a method according to the present invention includes a data processor and a data structure storing instructions executable by the data processor. The data structure may additionally store expressions of system functions.

DESCRIPTION

Figure 1:
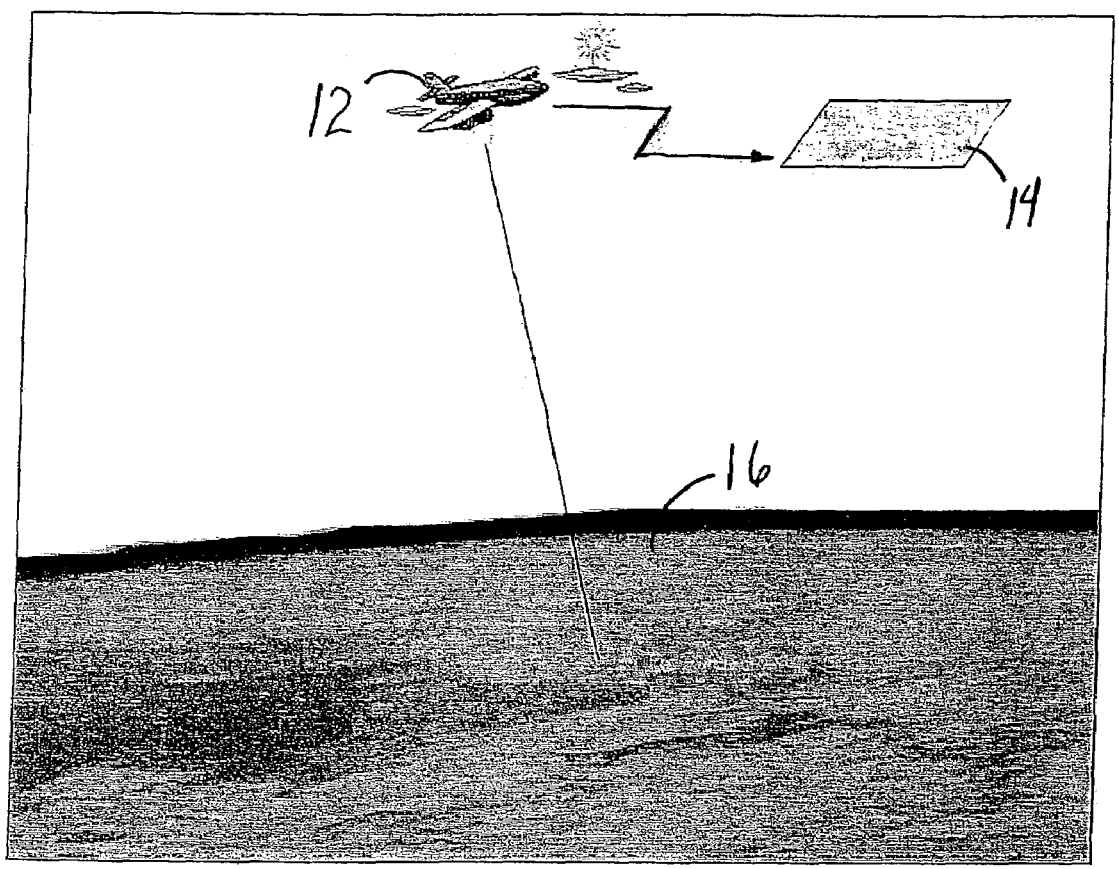
FIG. 1 is a schematic view of an imaging system (in this case, an airborne remote sensing system) used in conjunction with an embodiment of the method of the present invention.

Reference is now made to the figures wherein like parts are referred to by like numerals throughout. The present invention is a new image restoration process, and device for implementing such a process, that includes the construction of the system Optical Transfer Function ("OTF") and the precise representation of the Wiener filter using the system OTF and the power spectra of the measured image and the system noise. More specifically, the present invention is a method of creating and implementing a truly adaptive Wiener restoration scheme for electro-optical images. Such a method and device may be applied to many different electro-optical imaging systems, including cameras, scanners, thermal imaging, imaging of visible and/or non-visible light and radiation, medical imaging, and the like, without regard to the platform. The method and device may be implemented into the imaging system in many ways including through software, hardware, firmware, remote processing, or the like. FIG. 1 shows an example of an airborne electro-optical platform that could be used in conjunction with the present method and device. As shown in the figure, in an optional embodiment, an electro-optical imaging system 10 is mounted on an airplane 12 generating an image 14 of an object 16.

In constructing the Wiener filter of the present invention, the basic assumptions are: (1) the noise component n(x, y) and the object component f(x, y) are independent of each other; (2) the power spectrum of the noise is stationary; and (3) the power spectrum of the object is stationary. Using these assumptions, it can be proved that:

$$S_g(u,v)=S_f(u,v)|H(u,v)|^2+S_n(u,v)$$

Therefore, $$S_f(u, v) = \frac{S_g(u, v) - S_n(u, v)}{|H(u, v)|^2}$$

and $$W(u, v) = \frac{1}{H(u, v)} \frac{|H(u, v)|^2}{|H(u, v)|^2+|H(u, v)|^2 S_n(u, v)/[S_g(u, v) - S_n(u, v)]}$$

which reduces to:

$$W(u, v) = \frac{1}{H(u, v)}\left(1 - \frac{S_n(u, v)}{S_g(u, v)}\right)$$

The Wiener filter has three components H(u,v), $S_n$(u,v) and $S_f$(u,v) or $S_g$(u,v), where: (1) H(u,v) is directly determined by the electro-optical system of the sensor; (2) $S_f$(u,v) relies on the object; and (3) $S_n$(u,v) is related to the system noise. The system noise-to-object ratio $S_n$(u,v)/$S_f$(u,v) can be difficult to estimate in the real world, since the object power spectrum $S_f$(u,v) is not really known. On the other hand, the image power spectrum $S_g$(u,v) can be computed from the image and $S_n$(u,v) can be measured in a test or theoretically derived. Therefore, the noise-to-image ratio $S_n$(u,v)/$S_g$(u,v) is much easier to calculate, and it is the advantage of using this formula in constructing object-adaptive Wiener filters.

Using the convolution theory:

$$S_g(u,v)=F[g(x,y) \Theta g(x,y)]=G(u,v)G^*(u,v)$$

$$S_n(u,v)=F[n(x,y) \Theta n(x,y)]=N(u,v)N^*(u,v)$$

the form of the Wiener filter can be directly represented by the Fourier transforms of the object and the noise term:

$$W(u, v) = \frac{1}{H(u, v)}\left(1 - \frac{N(u, v)N^*(u, v)}{G(u, v)G^*(u, v)}\right)$$

In a further simplification, certain restrictions on the coordinate system may greatly reduce the burden of complex number handling in calculation. It is assumed, therefore, that the h(x,y), f(x,y), g(x,y) and n(x,y) are functions and random functions defined in the first quadrangle (x≧0 and y≧0) of a Cartesian coordinate system and extended to other quadrangles through real complete symmetry extensions.

That is:

$$h^*(x,y)=h(x,y)=h(-x,y)=h(x,-y)$$

$$f^*(x,y)=f(x,y)=f(-x,y)=f(x,-y)$$

$$g^*(x,y)=g(x,y)=g(-x,y)=g(x,-y)$$

$$n^*(x,y)=n(x,y)=n(-x,y)=n(x,-y)$$

Using the real complete symmetry property of Fourier transform, we can conclude the real complete symmetry for all H(u,v), F(u,v), G(u,v) and N(u,v). In practice, we only need to assume that h(x,y), f(x,y), g(x,y) and n(x,y) are real and defined for x≧0 and y≧0. The extension work can be completed by a computer program in which memory space need only be allocated for real arrays because H((u, v)), F((u, v)), G((u, v)), and N((u, v)) are all real.

Using the real complete symmetry assumptions and with other known Fourier properties, the above-referenced Wiener filter can be expressed:

$$W(u, v) = \frac{1}{H(u, v)}\left(1 - \frac{N^2(u, v)}{G^2(u, v)}\right)$$

This equation has fundamental importance for resolving the Wiener filter. In this equation, G(u,v) can be directly computed from the image g(x,y), H(u,v) is assumed to be known and can be estimated from the system electro-optical and motion Modulation Transfer Functions ("MTFs"), and N(u,v) can be calculated from the appropriate noise model.

The Wiener restoration scheme can be expressed as:

$$F^w(u, v) = W(u, v)G(u, v) = \frac{G(u, v)}{H(u, v)}\left(1 - \frac{N^2(u, v)}{G^2(u, v)}\right)$$

The improvements made by the present Wiener restoration scheme include avoiding the noise enhancement and/or noise introduction found in a true restoration process. This is because even though it is generally assumed that $|N(u,v)| \leq |G(u,v)|$, since $N(u,v)$ may have a different sign from $G(u,v)$, the factor $$\left(1 - \frac{N(u, v)}{G(u, v)}\right)$$

may actually be greater than 1 (for instance, in the case of $N(u,v)=-G(u,v)$). A direct inverse restoration does not have any control over the noise, and when $H(u,v)$ approaches zero, the filter goes unbounded.

To implement the Wiener filter in the form:

$$W(u, v) = \frac{1}{H(u, v)}\left(1 - \frac{N^2(u, v)}{G^2(u, v)}\right)$$

three components, $H((u, v))$, $G((u, v))$, and $N((u, v))$, are estimated. Suppose the size of the intended restoration kernel is n×n. Then the above equation becomes:

$$W_{n \times n}(u, v) = \frac{1}{H_{n \times n}(u, v)}\left(1 - \frac{N_{n \times n}^2(u, v)}{G_{n \times n}^2(u, v)}\right)$$

or, written simply:

$$W_n(u, v) = \frac{1}{H_n(u, v)}\left(1 - \frac{N_n^2(u, v)}{G_n^2(u, v)}\right)$$

where $W_n(u,v)$ is the discrete Wiener kernel and n is the size of the discrete Wiener kernel. Subsequently, the construction of $W_n(u,v)$ can be broken down into computations for $H_n(u,v)$, $G_n(u,V)$ and $N_n(u,v)$ respectively.

1. The Computation of $H_n(u,v)$

Option 1: Individual System Approach

If the Modulation Transfer function (MTF) of the individual imaging system has been measured in either laboratory or field conditions, then the Fourier transform of the optical transfer function, $H(u,v)$, can be reconstructed through the following procedure, using the derivative continuity assumption of $H(u,v)$.

By separability, $H(u,v)=H_u(u)H_v(v)$. The construction for $H_u(u)$ and $H_v(v)$ are similar. The following describes the construction of $H_u(u)$. Since $MTF_u(0)=1$, $H_u(0)=MTF_u(0)=1$. Assume that the set $U_0=\{U_k\}_{k=1}^n$ contains all frequencies such that $0<u_1<u_2< \ldots <u_n$ and $MTF_u(u_k)\equiv 0$. For u $\in[0, u_1)$, let $H_u(u)=MTF_u(u)$. For u $\in[u_1, u_2)$, the present embodiment checks the derivatives (or the slope on the plots) of $MTF_u(u)$ at point $u_1$. If:

$$\frac{dMTF_u(u_1^-)}{du} = \frac{dMTF_u(u_1^+)}{du}$$

then let $H_u(u)=MTF_u(u)$. Otherwise, let $H_u(u)-MTF_u(u)$. This process can be continued as follows:

Let sign(k) be defined as:

$$\text{sign}(k) = \begin{cases} 1 & \text{if } \frac{dMTF_u(u_k^-)}{du} = \frac{dMTF_u(u_k^+)}{du} \\ -1 & \text{if } \frac{dMTF_u(u_k^-)}{du} \neq \frac{dMTF_u(u_k^+)}{du} \end{cases}$$

and let:

$$H_u(u) = \begin{cases} MTF_u(u) & \text{if } u \in [0, u_1) \\ \prod_i^k \text{sign}(i) MTF(u) & \text{if } u \in [u_k, u_{k+1}), k = 1, 2, \ldots n \end{cases}$$

where $u_{n+1}=\infty$.

This procedure would allow the OTF to be reconstructed with continuous derivatives. There is a simple situation when $MTF_u(u) \neq 0$. Since $MTF_u(u)$ is continuous and $MTF_u(0)=1$, $MTF_u(u)>0$. Consequently, the following relationship is provided: $H_u(u)=MTF_u(u)$.

Once $H_u(u)$ and $H_v(v)$ are obtained through the above procedure, they can be resampled using a regular spline technique to match the size and Wiener kernel. Suppose the discrete forms of these two functions are $H_u''(u)$ and $H_v''(v)$, then $H_n(u,v)$ can be estimated by simply letting $H_n(u,v)=H_u''(u)H_v''(v)$.

Figure 2:
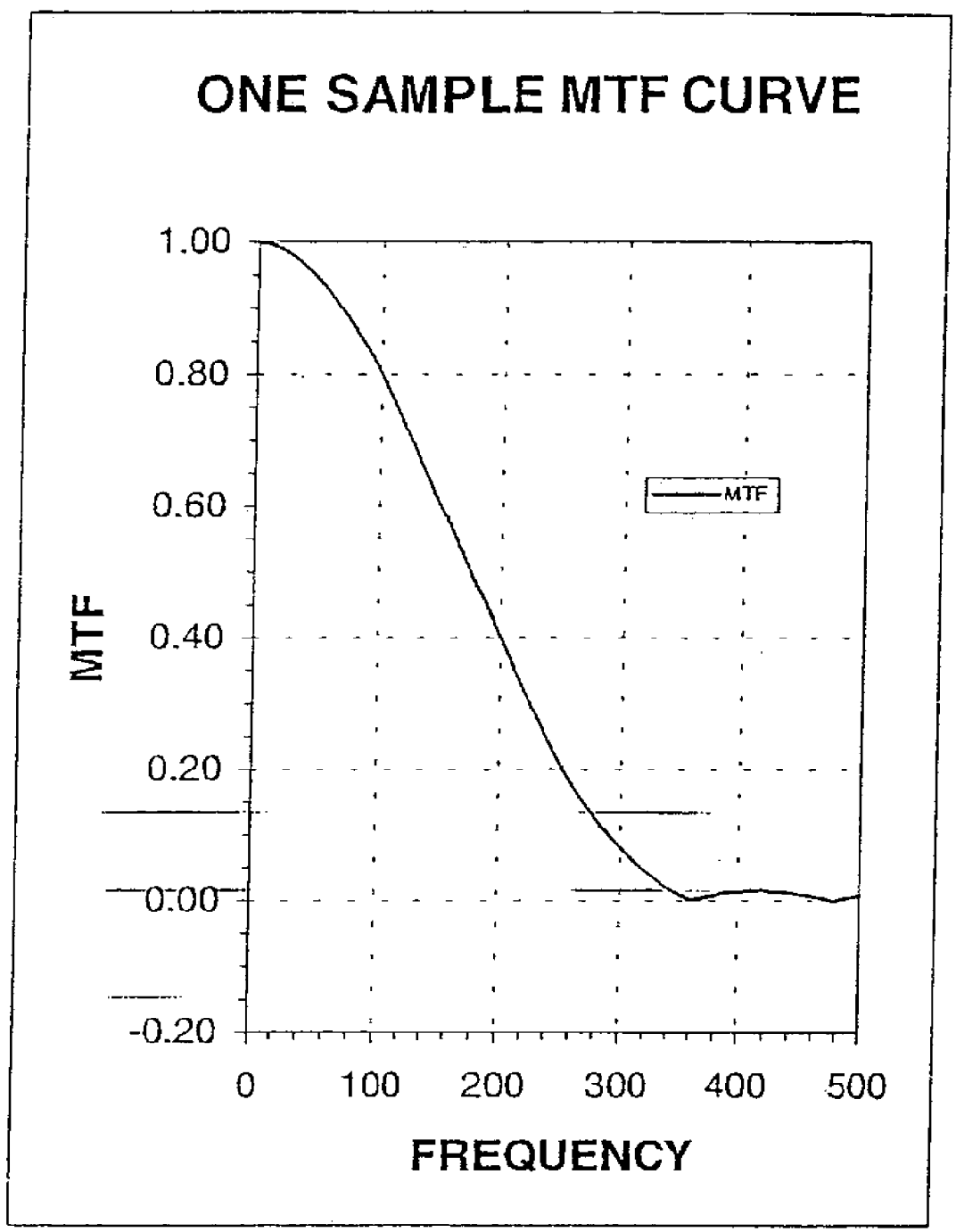
FIG. 2 is a sample MTF curve of the imaging system.
Figure 3:
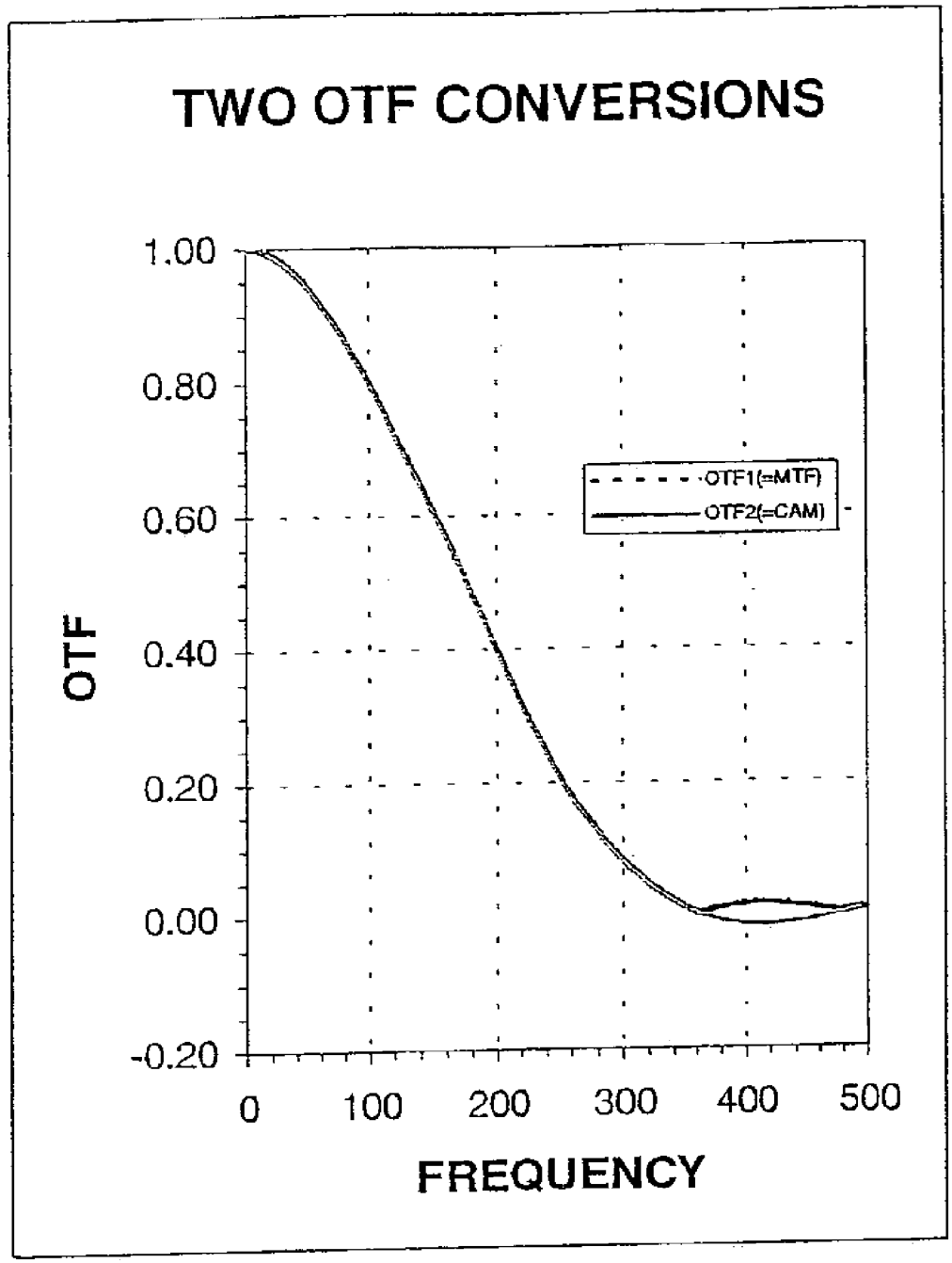
FIG. 3 shows two OTF curves reconstructed from the sample MTF curve of FIG. 2.

For example, FIG. 2 shows a sample MTF curve for an airborne imaging system with two zero points at frequencies $u_1=362$ and $u_2=477$ cycles/radian, which represent discontinuities in the MTF at those two points. There are at least two ways to reconstruct the relevant OTF. One of them is simply $H_u(u)=MTF_u(u)$, which inevitably would inherit the derivative discontinuities from MTF. In an alternate embodiment, the OTF is obtained by applying the procedure described above. This embodiment maintains derivative continuity. The second approach may be called the derivative Continuity Adjusted MTF ("CAM") approach. Both reconstructed OTFs are plotted in FIG. 3.

Option 2: Group Approach

The second option is to assume that $H(u,v)$ of the imaging system satisfies a universal mathematical or empirical model for a group of imaging systems. This option is useful when measuring the MTF of the individual imaging system is impossible, such as the home-use desktop scanner or a personal camera situation. However, the manufacturer may assume that all their desktop scanners or cameras of the some model have the same optical transfer function $H(u,v)$. Again, the universal $H(u,v)$ can be derived as described above in option 1 in the laboratory of the manufacturer. Therefore the manufacturer can implement a compensation or restoration procedure in the processing components, such as hardware, software, or firmware, of the scanner, camera, or other imaging system, so that the images produced by the scanners or camera would be crisper or more realistic than the images acquired by scanners or cameras without the restoration chips. For medical imaging systems and military imaging systems, this could potentially enhance the detection of normally undetectable anomalies or targets.

Option 3: Optical Model Approach

In an optional alternate approach to option 1 and option 2, it is assumed that the quality of the image is only affected by the optics of the imaging system. It is assumed that the optical transfer function $H(u,v)$ takes some standard forms, such as those derived from a diffraction-limited system with a specific pupil functions. The key is not the computation of H(u,v) itself, rather it is the procedure that integrating H(u,v), G(u,v) and N(u,v) for the restoration of the image.

2. The computation of $G_n(u,v)$

Option 1: Global Estimation Approach

The direct approach for computing $G_n(u,v)$ consists of two steps: (1) compute the discrete Fourier transform of the whole image G(u,v); and (2) take the first n frequencies (including both positive and negative frequencies) from G(u,v). This produces exact $G_n(u,v)$. However, this approach may require a great deal of time to compute $G_n(u,v)$ if the image size is big.

Option 2: Local Estimation Approach

The method and system may also compute $G_n(u,v)$ using a sampling approach as follows. Letting the restoration kernel be of size n×n, a number, N, of non-overlapping random sample windows are generated in the scene. A sampled $G_{n,k}(u,v)$ is computed for each of those sample windows. The averaged $$G_n(u, v) = \frac{1}{N} \sum_k G_{n,k}(u, v)$$

for all those sampled windows can be use to estimate the true $G_n(u,v)$. This method is much faster than the global estimation approach for large images.

3. The computation of $N_n(u,v)$

Option 1: Instrumental Approach

N(u,v) could be estimated from laboratory measurements. This can be done for example, by manufacturers of scanners or cameras.

Option 2: Minimum Noise Approach

As an alternative to testing the imaging system noise, and if the image is acquired and written as integers, a minimum noise approach may be used in which:

$$N_n(u, v) = \min\left\{1, \min_{u,v} |G_n(u, v)|\right\}$$

Option 3: Reference Target Approach

If the imaging system is one of a kind, such as an airborne or a satellite-borne remote sensing system, the noise level can be computed using a reference target, or computed from a selected homogeneous region from the whole image.

Option 4: Parametric Approach

Finally, the noise may be assumed to satisfy some mathematics model, such as a Gaussian Noise.

4. The procedure for computing $W_n(u,v)$ and $w_n(x,y)$

Figure 7:
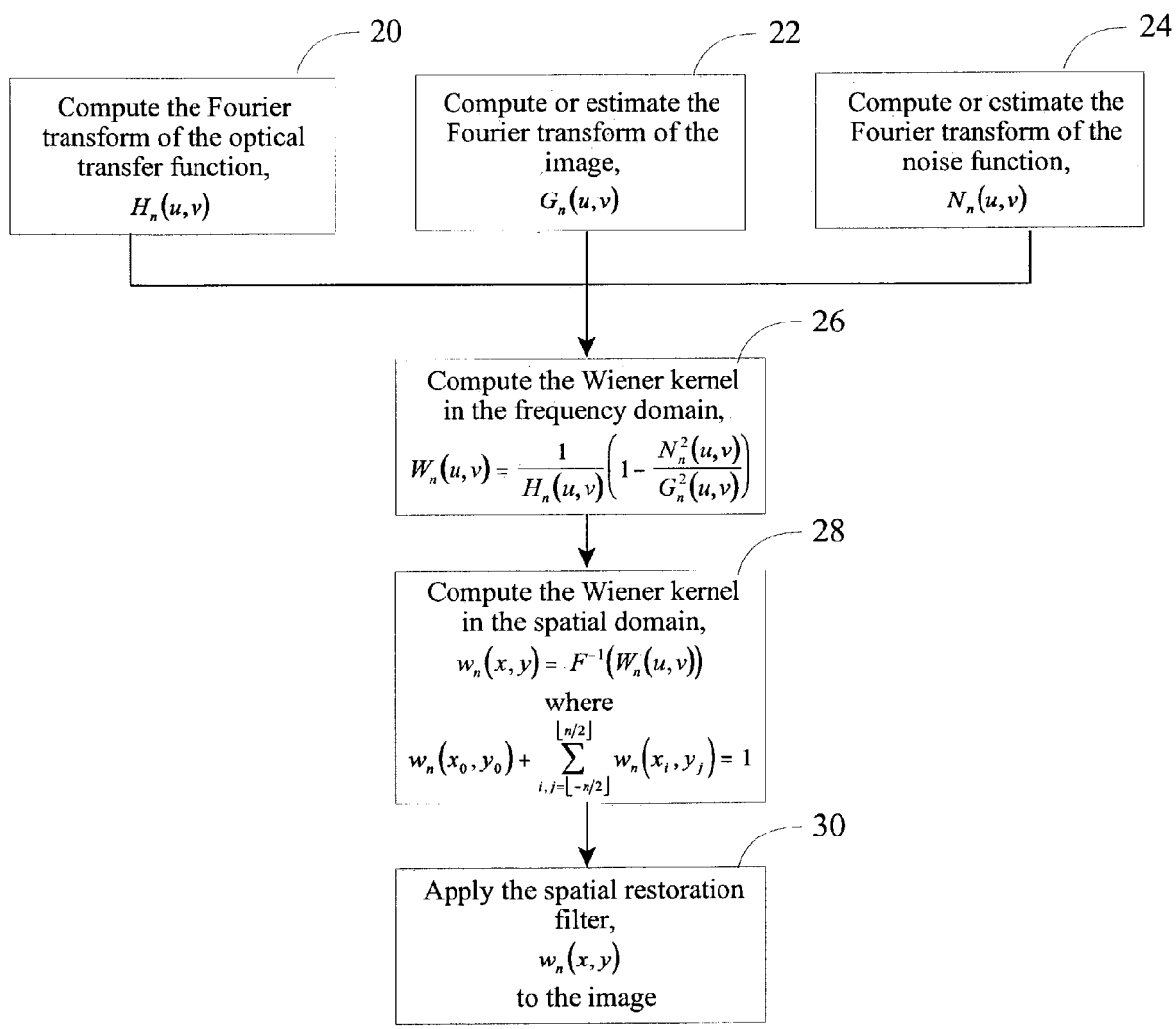
FIG. 7 is a flowchart of a method according to an embodiment of the present invention.

The computational procedure for the Wiener restoration, shown in FIG. 7, is summarized as follows:

(1) Choose an option for computing 20

$H_n(u,v)$ (2) Choose an option for computing 22

$G_n(u,v)$ (3) Choose an option for computing 24

$N_n(u,v)$.

(4) Compute 26

$$W_n(u, v) = \frac{1}{H_n(u, v)}\left(1 - \frac{N_n^2(u, v)}{G_n^2(u, v)}\right).$$

(5) Compute 28 the Wiener kernel in the spatial domain by applying the inverse Fourier transform:

$w_n(x,y) = F^{-1}(W_n(u,v))$ where $w_n(x,y)$ is subject to the constraint:

$$w_n(x_0, y_0) + \sum_{i,j=\lfloor -n/2 \rfloor}^{\lfloor n/2 \rfloor} w_n(x_i, y_j) = 1$$

Figure 8:
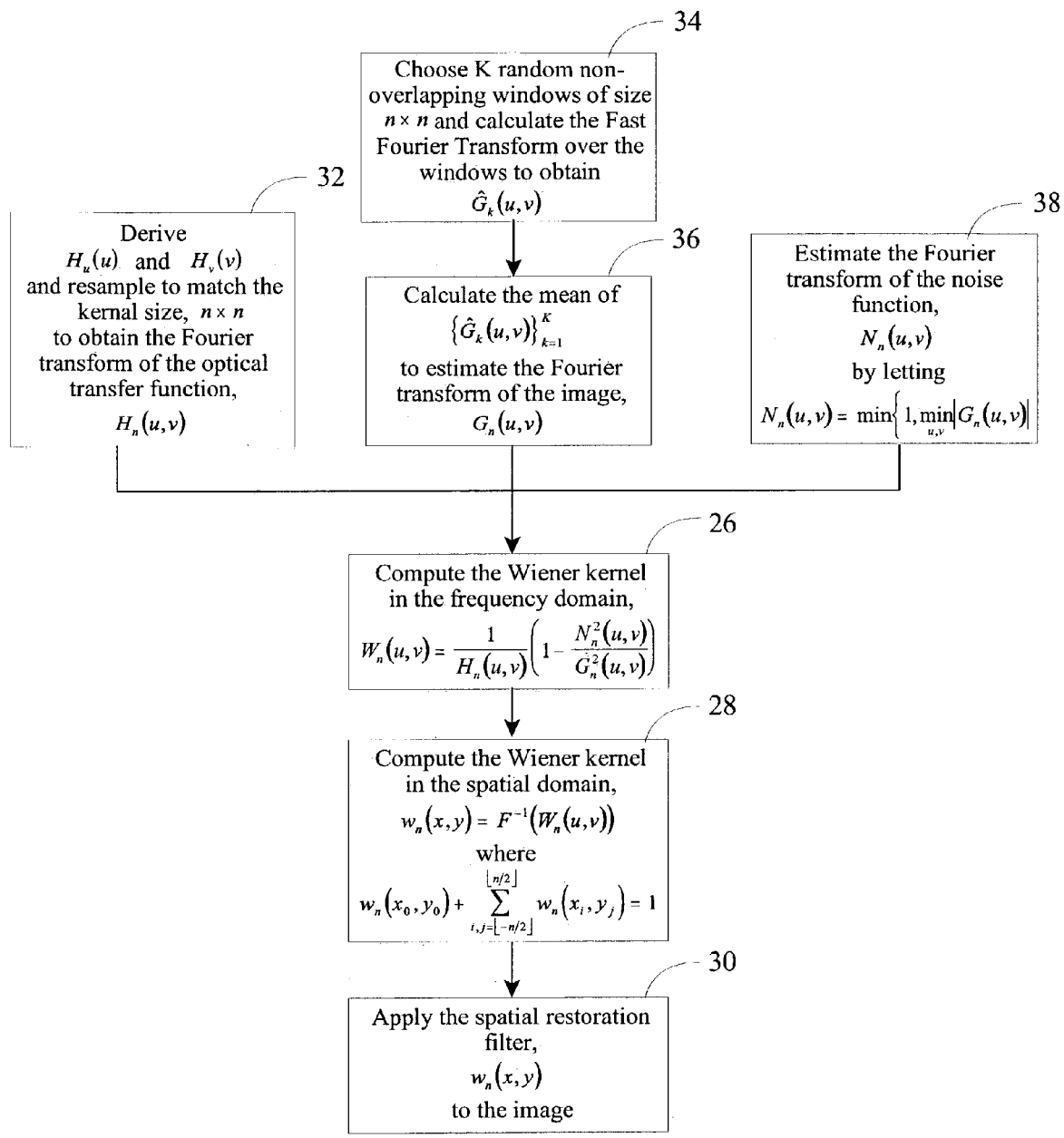
FIG. 8 is a flowchart of a method according to an embodiment of the present invention.

(6) Apply 30 spatial restoration filter $w_n(x,y)$ to the image. In particular, the following procedure, shown in FIG. 8, may be used in an optional embodiment for an airborne multispectral scanner imaging system:

(1) Derive 32 $H_u(u)$ and $H_v(v)$ from the system resultant OTFs and resample them to match the kernel size n×n.

(2) For a given image, choose K random non-overlapping windows 34 of size n×n pixels, and calculate the fast Fourier transform over the windows to obtain estimate $\hat{G}_k(u,v)$. Use 36 the mean of $\{\hat{G}_k(u,v)\}_{k=1}^K$ to estimate G(u,v).

(3) For a given image, estimate 38 the Fourier transform of the noise function by letting $$N_n(u, v) = \min\left\{1, \min_{u,v}|G_n(u, v)|\right\}$$

(4) Compute 26 the Wiener kernel in the frequency domain:

$$W_n(u, v) = \frac{1}{H_n(u, v)}\left(1 - \frac{N_n^2(u, v)}{G_n^2(u, v)}\right)$$

(5) Compute 28 the Wiener kernel in the spatial domain by applying the inverse Fourier Transform:

$w_n(x,y) = F^{-1}(W_n(u,v))$ where $w_n(x,y)$ is subject to the constraint:

$$w_n(x_0, y_0) + \sum_{i,j=\lfloor -n/2 \rfloor}^{\lfloor n/2 \rfloor} w_n(x_i, y_j) = 1$$

(6) Apply 30 spatial restoration filter $w_n(x,y)$ to the image.

Figure 4:
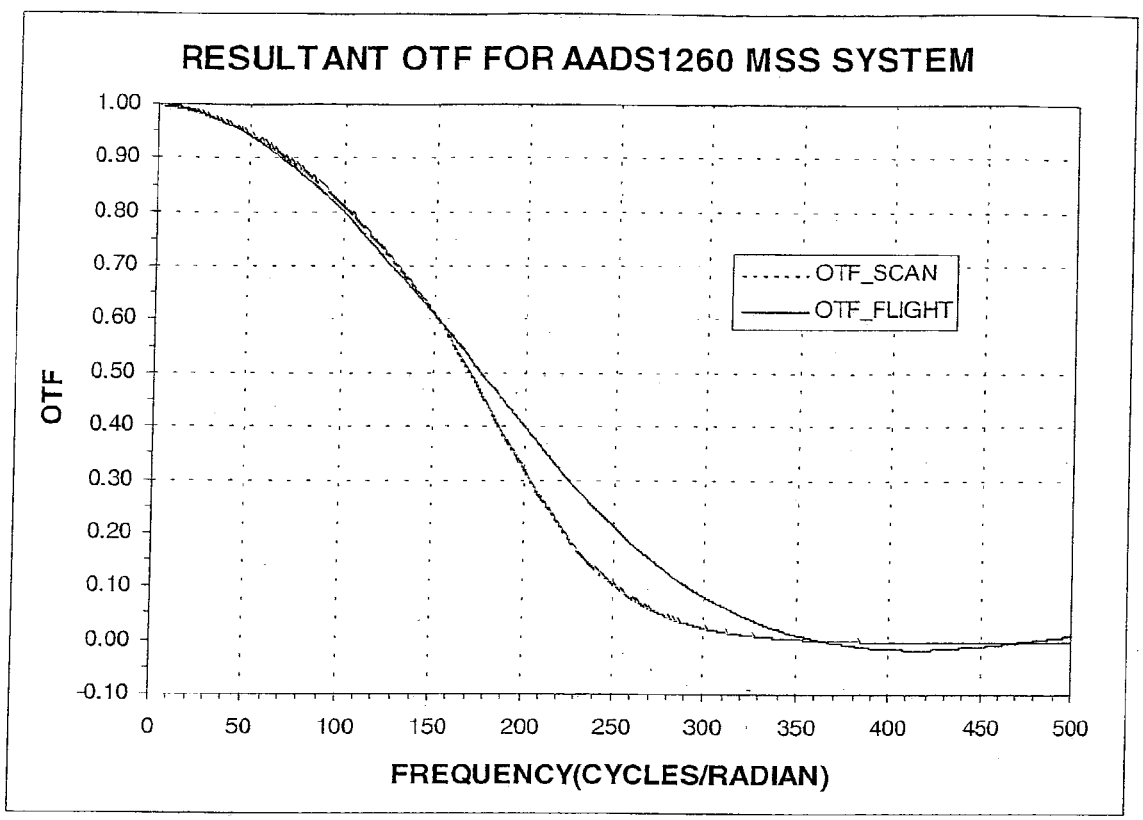
FIG. 4 shows OTF curves of an example system used to estimate H(u,v)
Figure 5:
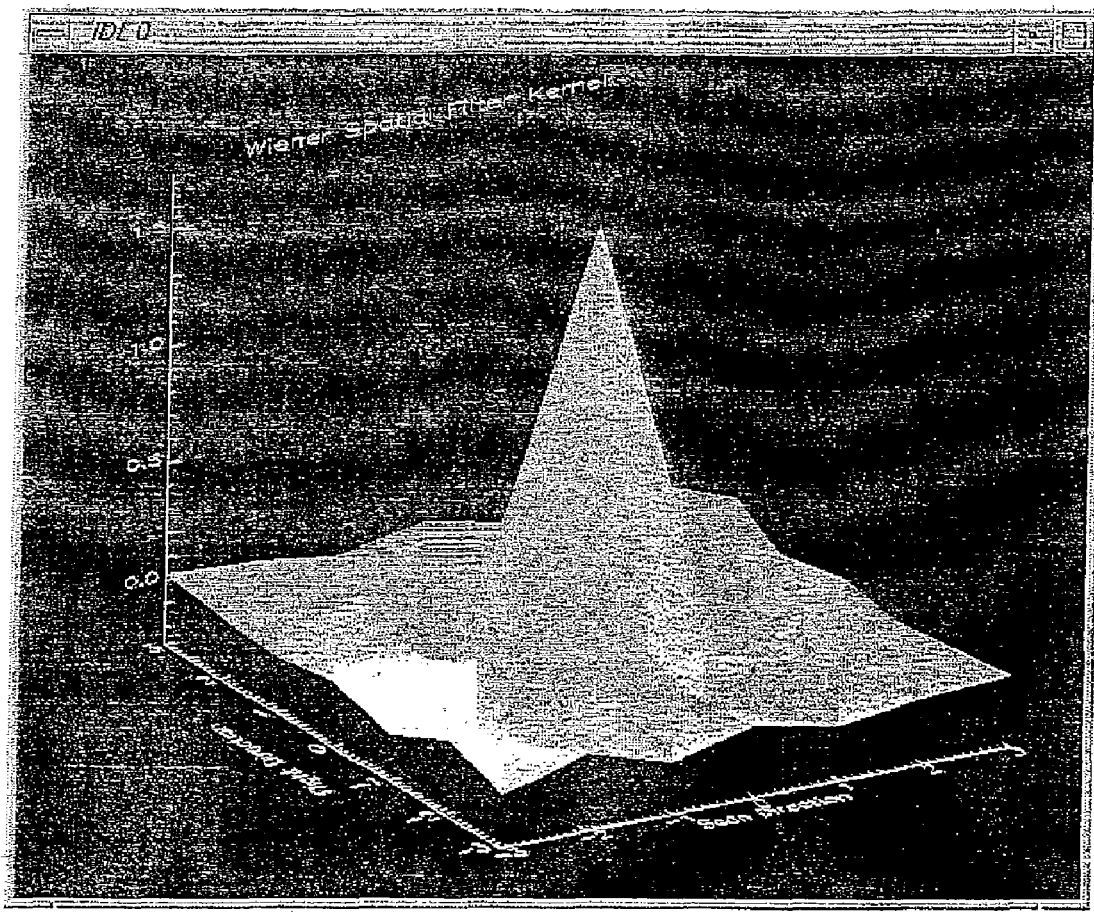
FIG. 5 shows a typical Wiener restoration kernel in the spatial domain constructed using the method of the present invention.
Figure 6:
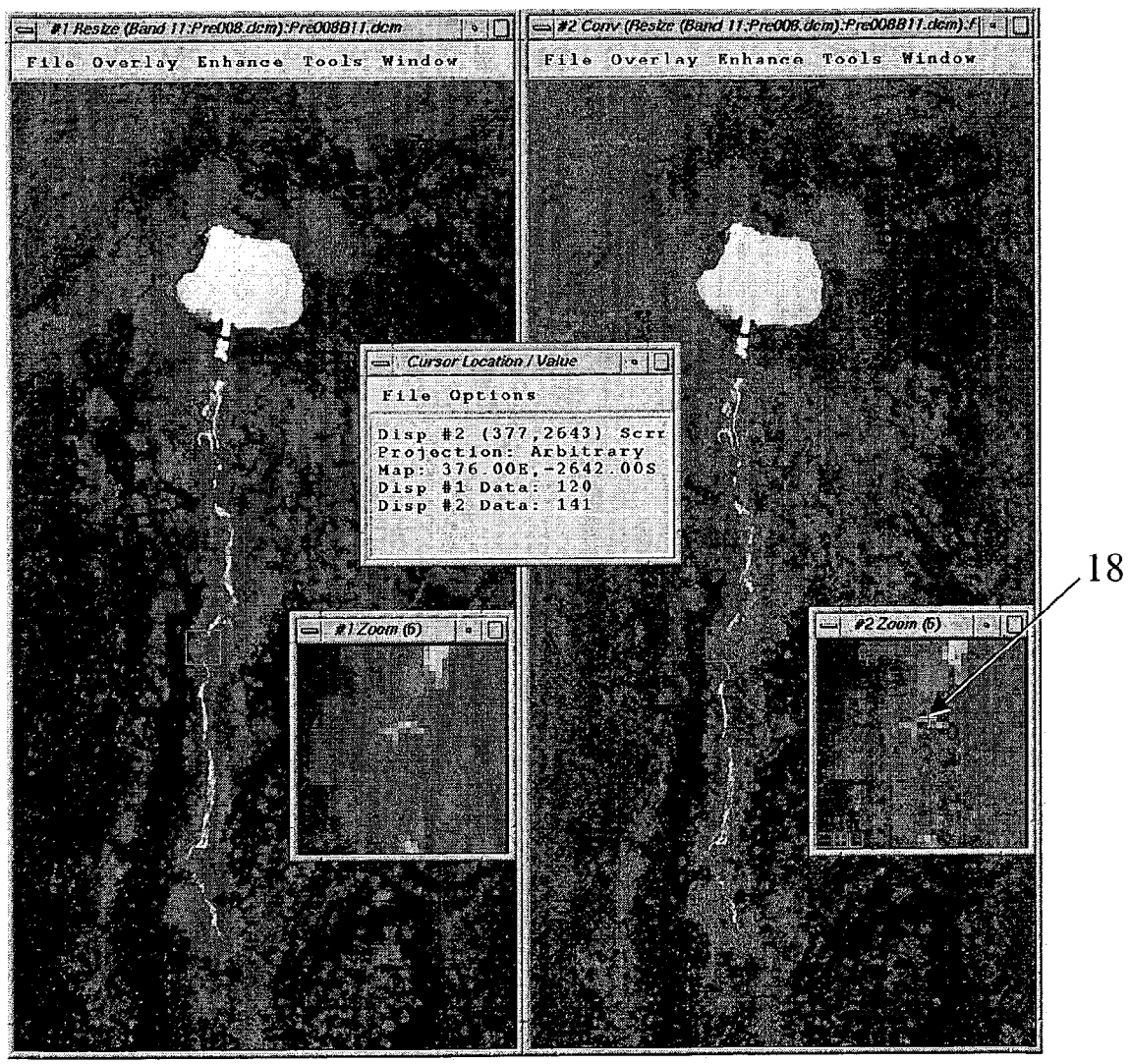
FIG. 6 shows an unrestored image on the left and an image on the right restored according to an embodiment of the present invention.

For example, in an optional embodiment the present invention may be implemented for DaedaluS™ DS 1260 thermal data, is shown in FIGS. 4–6. The MTF of the thermal channel of the system is shown in FIG. 4. A typical image acquired by such system is shown in the left panel of the FIG. 6. The restored image using the present invention is shown in the right panel of FIG. 6 illustrating that the small weak high temperature anomaly 18 has been enhanced by the restoration process. The Wiener restoration kernel in the spatial domain adapted to this particular image is shown in FIG. 5.

Figure 9:
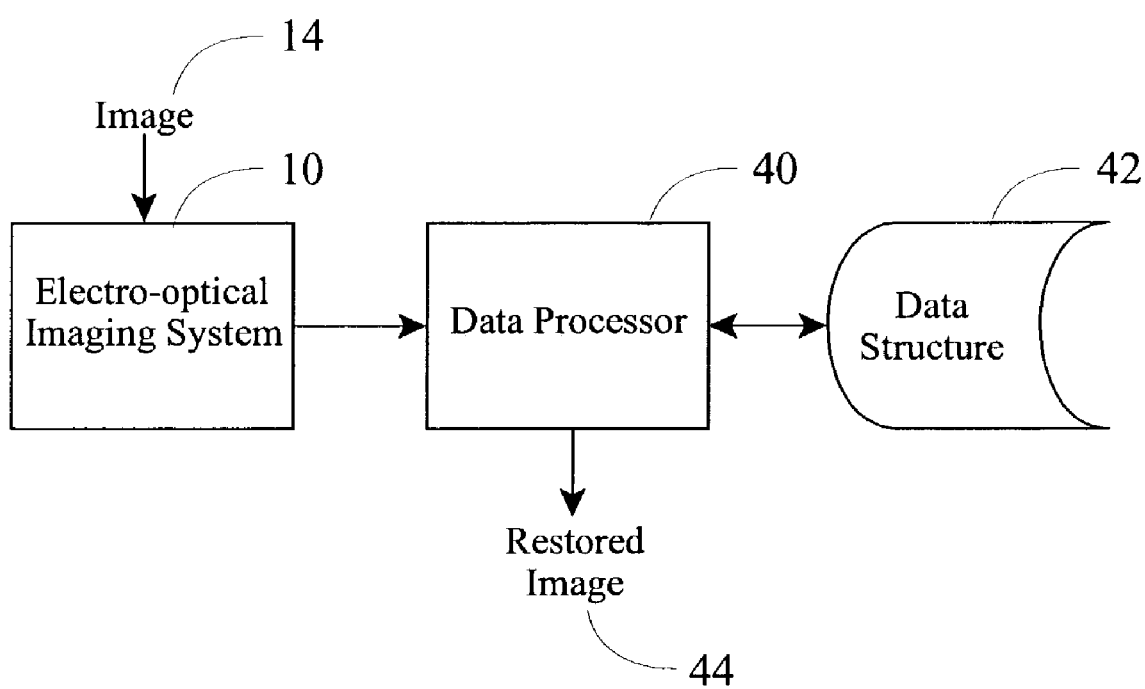
FIG. 9 is a block diagram of a device according to an embodiment of the present invention.

As discussed above, the present method may be implemented in the electro-optical imaging system through software, hardware, firmware, remote processing, or the like. One optional embodiment of a device implementing the method is shown in FIG. 9. In this optional embodiment, a data processor 40 receives image data 14 from the electro-optical imaging system 10. It should be noted that the present invention contemplates that the present invention may use a single shared data processor for the electro-optical imaging system 10 and the device implementing the Wiener filtering method or may use multiple data processors.

The present invention also includes a data structure 42 communicating with the data processor 40. The data structure 42 may take many forms including magnetic storage, optical storage, random access memory, read-only memory, electrically alterable read-only memory, flash memory, electrically programmable read-only memory, or any other form of memory.

The data structure 42 stores instructions for the data processor 40 to be implement a method according to the present invention to create a restored image 44. For example, in one optional embodiment, the data structure 42 stores instructions for the data processor 40 to implement the method shown in FIG. 7, namely:

(1) Choose an option for computing 20

$H_n(u,v)$ (2) Choose an option for computing 22

$G_n(u,v)$ (3) Choose an option for computing 24

$N_n(u,v)$.

(4) Compute 26 the Wiener kernel in the frequency domain:

$$W_n(u, v) = \frac{1}{H_n(u, v)}\left(1 - \frac{N_n^2(u, v)}{G_n^2(u, v)}\right).$$

(5) Compute 28 the Wiener kernel in the spatial domain by applying the inverse Fourier transform:

$w_n(x,y)=F^{-1}(W_n(u,v))$ where $w_n(x,y)$ is subject to the constraint:

$$w_n(x_0, y_0) + \sum_{i,j=\lfloor -n/2 \rfloor}^{\lfloor n/2 \rfloor} w_n(x_i, y_j) = 1$$

(6) Apply 30 spatial restoration filter $w_n(x,y)$ to the image.

As described above, many options are available for determining the Fourier transforms of a system optical transfer function, a spatial representation of the image, and a system noise function. However, in a further embodiment, the Fourier transforms of a system optical transfer function and a system noise function may be determined beforehand, using one of the options described above or any other method, and stored in the data structure 42. While this method may be used for any implementation, it is contemplated that scanners, cameras, medical imaging devices, and the like could use this further method.

While certain embodiments of the present invention have been shown and described, it is to be understood that the present invention is subject to many modifications and changes without departing from the spirit and scope of the claims presented herein.

I claim:

1. A method for restoration of an image acquired by an electro-optical imaging system to enhance the image details using an adaptive Wiener filtering scheme, the method comprising:

computing the Fourier transform of an optical transfer function, $H_n(u,v)$, of said electro-optical imaging system;

computing the Fourier transform of a spatial representation of the image, $G_n(u,v)$;

computing the Fourier transform of a noise function of said electro-optical imaging system, $N_n(u,v)$;

computing the Fourier transform of a Wiener kernel, $W_n(u,v)$, according to the relationship:

$$W_n(u, v) = \frac{1}{H_n(u, v)}\left(1 - \frac{N_n^2(u, v)}{G_n^2(u, v)}\right);$$

computing the Wiener kernel, $w_n(x,y)$, in the spatial domain by applying the inverse Fourier transform: $w_n(x,y)=F^{-1}(W_n(u,v))$, where $w_n(x,y)$ is subject to the constraint:

$$w_n(x_0, y_0) + \sum_{i,j=\lfloor -n/2 \rfloor}^{\lfloor n/2 \rfloor} w_n(x_i, y_j) = 1;$$

and applying the Wiener kernel in the spatial domain, $w_n(x,y)$, to said image.

2. The method of claim 1 wherein the step of computing the Fourier transform of an optical transfer function of said electro-optical imaging system, $H_n(u,v)$, comprises:

determining the modulation transfer function of said electro-optical imaging system, $MTF_n(u,v)$; and reconstructing the Fourier transform of an optical transfer function of said electro-optical imaging system, $H_n(u,v)$, with continuous derivatives from the modulation transfer function of said electro-optical imaging system using a continuity adjusted modulation transfer function approach.

3. The method of claim 2 wherein the step of reconstructing the Fourier transform of an optical transfer function of said electro-optical imaging system, $H_n(u,v)$, with continuous derivatives from the modulation transfer function of said electro-optical imaging system, comprises:

assuming $H_n(u,v)$ to be separable such that $H(u,v)=H_u(u)H_v(v)$;

defining $$H_u(u) = \begin{cases} MTF_u(u) & \text{if } u \in [0, u_1) \\ \prod_i^k sign(i)MTF(u) & \text{if } u \in [u_k, u_{k+1}), k = 1, 2, \ldots n \end{cases}$$

wherein $$\text{sign}(k) = \begin{cases} 1 & \text{if } \dfrac{dMTF_u(u_k^-)}{du} = \dfrac{dMTF_u(u_k^+)}{du} \\ -1 & \text{if } \dfrac{dMTF_u(u_k^-)}{du} \neq \dfrac{dMTF_u(u_k^+)}{du} \end{cases};$$

defining $H_u(v) =$ $$\begin{cases} MTF_u(v) & \text{if } u \in [0, v_1) \\ \prod_i^k \text{sign}(i) MTF(v) & \text{if } v \in [v_k, v_{k+1}), k = 1, 2, \ldots n \end{cases}$$

wherein $\text{sign}(k) = \begin{cases} 1 & \text{if } \dfrac{dMTF_v(v_k^-)}{dv} = \dfrac{dMTF_v(v_k^1)}{dv} \\ -1 & \text{if } \dfrac{dMTF_v(v_k^-)}{dv} \neq \dfrac{dMTF_u(v_k^+)}{dv} \end{cases};$ resampling $H_u(u)$ and $H_v(v)$ using conventional spline technique to match the kernel size n×n;
computing $H(u,v)$ $H_u(u)H_v(v)$.

4. The method of claim 1 wherein the step of computing the Fourier transform of an optical transfer function of said electro-optical imaging system, $H_n(u,v)$, where a substantially similar electro-optical imaging system is measurable, comprises:
measuring the modulation transfer function of the substantially similar electro-optical imaging system;
reconstructing the Fourier transform of an optical transfer function of the substantially similar electro-optical imaging system with continuous derivatives from the modulation transfer function of substantially similar electro-optical imaging system; and
assuming the Fourier transform of an optical transfer function of said electro-optical imaging system is equivalent to the reconstructed Fourier transform of an optical transfer function of the substantially similar electro-optical imaging system.

5. The method of claim 1 wherein the step of computing the Fourier transform of an optical transfer function of said electro-optical imaging system, $H_n(u,v)$, comprises:
assuming the optical transfer function is affected only by the optical characteristics of said electro-optical imaging system; and
deriving the Fourier transform of an optical transfer function of said electro-optical transfer function based on the optical characteristics of said electro-optical imaging system.

6. The method of claim 1 wherein the step of computing the Fourier transform of a spatial representation of the image, $G_n(u,v)$, comprises:
computing the discrete Fourier transform of a spatial representation of the whole image $G(u,v)$; and
taking the first n frequencies, including both positive and negative frequencies, from $G(u,v)$ to produce an exact $G_n(u,v)$ across the whole image.

7. The method of claim 1 wherein the step of computing the Fourier transform of a spatial representation of the image, $G_n(u,v)$, comprises:
generating k non-overlapping random sample windows in the image;
computing a sampled $G_{n,k}(u,v)$ for each sample window;
estimating $G_n(u,v)$ by averaging $G_{n,k}(u,v)$ across all sample windows according to the relationship:

$$G_n(u, v) = \frac{1}{k} \sum_k G_{n,k}(u, v).$$

8. The method of claim 1 wherein the step of computing the Fourier transform of a noise function of said electro-optical imaging system, $N_n(u,v)$, comprises determining experimentally the noise characteristics of said electro-optical imaging system.

9. The method of claim 1 wherein the step of computing the Fourier transform of a noise function of said electro-optical imaging system, $N_n(u,v)$, comprises assuming the Fourier transform of a noise function of said electro-optical imaging system relates to the Fourier transform of a spatial representation of the image, $G_n(u,v)$, according to the relationship:

$$N_n(u, v) = \min\left\{1, \min_{u,v} |G_n(u, v)|\right\}.$$

10. The method of claim 1 wherein the step of computing the Fourier transform of a noise function of said electro-optical imaging system, $N_n(u,v)$, comprises:
selecting a reference target; and
computing the Fourier transform of a noise function of said electro-optical imaging system, $N_n(u,v)$, based on the selected reference target.

11. The method of claim 1 wherein the step of computing the Fourier transform of a noise function of said electro-optical imaging system, $N_n(u,v)$, comprises:
selecting a homogeneous region from the whole image; and
computing the Fourier transform of a noise function of said electro-optical imaging system, $N_n(u,v)$, based on the selected homogeneous region.

12. The method of claim 1 wherein the step of computing the Fourier transform of a noise function of said electro-optical imaging system, $N_n(u,v)$, comprises assuming the Fourier transform of a noise function of said electro-optical imaging system satisfies a Gaussian noise model.

13. A method for restoration of an image acquired by an electro-optical imaging system to enhance the image details of small weak anomalies using an adaptive Wiener filtering scheme, the method comprising:
computing the Fourier transform of an optical transfer function, $H_n(u,v)$, of said electro-optical imaging system by determining the modulation transfer function of said electro-optical imaging system, $MTF_n(u,v)$ and reconstructing the Fourier transform of an optical transfer function of said electro-optical imaging system, $H_n(u,v)$, with continuous derivatives from the modulation transfer function of said electro-optical imaging system using a continuity adjusted modulation transfer function approach;
computing the Fourier transform of a spatial representation of the image, $G_n(u,v)$;
computing the Fourier transform of a noise function of said electro-optical imaging system, $N_n(u,v)$;
computing the Fourier transform of a Wiener kernel, $W_n(u,v)$, according to the relationship:

$$W_n(u, v) = \frac{1}{H_n(u, v)}\left(1 - \frac{N_n^2(u, v)}{G_n^2(u, v)}\right);$$

computing the Wiener kernel, $w_n(x,y)$, in the spatial domain by applying the inverse Fourier transform: $w_n(x,y)=F^{-1}(W_n(u,v))$, where $w_n(x,y)$ is subject to the constraint:

$$w_n(x_0, y_0) + \sum_{i,j=\lfloor -n/2 \rfloor}^{\lfloor n/2 \rfloor} w_n(x_i, y_j) = 1;$$

and applying the Wiener kernel in the spatial domain, $w_n(x,y)$, to said image.

14. The method of claim 13 wherein the step of reconstructing the Fourier transform of an optical transfer function of said electro-optical imaging system, $H_n(u,v)$, with continuous derivatives from the modulation transfer function of said electro-optical imaging system, comprises:

assuming $H_n(u,v)$ to be separable such that $H(u,v)=H_u(u) H_v(v)$; defining $$H_u(u) = \begin{cases} MTF_u(u) & \text{if } u \in [0, u_1) \\ \prod_{i}^{k} \text{sign}(i)MTF(u) & \text{if } u \in [u_k, u_{k+1}), k = 1,2, \ldots n \end{cases}$$

wherein $$\text{sign}(k) = \begin{cases} 1 & \text{if } \frac{dMTF_u(u_k^-)}{du} = \frac{dMTF_u(u_k^+)}{du} \\ -1 & \text{if } \frac{dMTF_u(u_k^-)}{du} \neq \frac{dMTF_u(u_k^+)}{du} \end{cases};$$

$$\text{defining } H_v(v) = \begin{cases} MTF_v(v) & \text{if } v \in [0, v_1) \\ \prod_{i}^{k} \text{sign}(i)MTF(v) & \text{if } v \in [v_k, v_{k+1}), k = 1, 2, \ldots n \end{cases}$$

$$\text{wherein sign}(k) = \begin{cases} 1 & \text{if } \frac{dMTF_v(v_k^-)}{dv} = \frac{dMTF_u(v_k^+)}{dv} \\ -1 & \text{if } \frac{dMTF_v(v_k^-)}{dv} \neq \frac{dMTF_v(v_k^+)}{dv} \end{cases};$$

resampling $H_u(u)$ and $H_v(v)$ using conventional spline technique to match the kernel size n×n;

computing $H(u,v)=H_u(u)H_v(v)$.

15. The method of claim 13 wherein the step of computing the Fourier transform of a spatial representation of the image, $G_n(u,v)$, comprises:

computing the discrete Fourier transform of a spatial representation of the whole image $G(u,v)$; and taking the first n frequencies, including both positive and negative frequencies, from $G(u,v)$ to produce an exact $G_n(u,v)$ across the whole image.

16. The method of claim 13 wherein the step of computing the Fourier transform of a spatial representation of the image, $G_n(u,v)$, comprises:

generating a plurality of non-overlapping random sample windows in the image;

computing a sampled $\hat{G}_{n,k}(u,v)$ for each sample window;

estimating $G_n(u,v)$ by averaging $G_{n,k}(u,v)$ across all sample windows according to the relationship:

$$G_n(u, v) = \sum_k G_{n,k}(u, v).$$

17. The method of claim 13 wherein the step of computing the Fourier transform of a noise function of said electro-optical imaging system, $N_n(u,v)$, comprises determining experimentally the noise characteristics of said electro-optical imaging system.

18. The method of claim 13 wherein the step of computing the Fourier transform of a noise function of said electro-optical imaging system, $N_n(u,v)$, comprises assuming the Fourier transform of a noise function of said electro-optical imaging system relates to the Fourier transform of a spatial representation of the image, $G_n(u,v)$, according to the relationship:

$$N_n(u, v) = \min\left\{1, \min_{u,v}|G_n(u, v)|\right\}.$$

19. The method of claim 13 wherein the step of computing the Fourier transform of a noise function of said electro-optical imaging system, $N_n(u,v)$, comprises:

selecting a reference target; and computing the Fourier transform of a noise function of said electro-optical imaging system, $N_n(u,v)$, based on the selected reference target.

20. The method of claim 13 wherein the step of computing the Fourier transform of a noise function of said electro-optical imaging system, $N_n(u,v)$, comprises:

selecting a homogeneous region from the whole image; and computing the Fourier transform of a noise function of said electro-optical imaging system, $N_n(u,v)$, based on the selected homogeneous region.

21. The method of claim 13 wherein the step of computing the Fourier transform of a noise function of said electro-optical imaging system, $N_n(u,v)$, comprises assuming the Fourier transform of a noise function of said electro-optical imaging system satisfies a Gaussian noise model.

22. A method for restoration of an image of an object in a scene acquired by an airborne multispectral scanner imaging system to enhance the image details using an adaptive Wiener filtering scheme that assumes (a) that a noise component and an object component are independent of each other, (b) that a power spectrum of the noise component is stationary and (c) that a power spectrum of the scene is stationary, the method comprising:

computing the Fourier transform of an optical transfer function, $H_n(u,v)$, of said electro-optical imaging system by deriving $H_u(u)$ and $H_v(v)$ from the system resultant optical transfer functions and resampling $H_u(u)$ and $H_v(v)$ to match the kernel size n×n;

computing the Fourier transform of a spatial representation of the image, $G_n(u,v)$, by selecting k random non-overlapping windows of size n×n pixels, calculating the fast Fourier transform over the windows to obtain an estimate $\hat{G}_k(u,v)$ for each window, and calculating the mean of $\{\hat{G}_k(u,v)\}_{k=1}^{K}$ to estimate $G_n(u,v)$;

computing the Fourier transform of a noise function of said electro-optical imaging system, $N_n(u,v)$, by assuming the Fourier transform of a noise function of said electro-optical imaging system relates to the Fourier transform of a spatial representation of the image, $G_n(u,v)$, according to the relationship:

$$N_n(u,v) = \min\left\{1, \min_{u,v}|G_n(u,v)|\right\};$$

computing the Fourier transform of a Wiener kernel, $W_n(u,v)$, according to the relationship:

$$W_n(u,v) = \frac{1}{H_n}\left(1 - \frac{N_n^2(u,v)}{G_n^2(u,v)}\right);$$

computing the Wiener kernel, $w_n(x,y)$, in the spatial domain by applying the inverse Fourier transform: $w_n(x,y)=F^{-1}(u,v))$, where $w_n(x,y)$ is subject to the constraint:

$$w_n(x_0, y_0) + \sum_{i,j=\lfloor -n/2 \rfloor}^{\lfloor n/2 \rfloor} w_n(x_i, y_j) = 1;$$

and
applying the Wiener kernel in the spatial domain, $w_n(x,y)$, to said image.

23. A device for restoration of an image acquired by an electro-optical imaging system, comprising:
 a data processor in communication with said electro-optical imaging system; and
 a data structure in communication with said data processor, said data structure storing instructions executable by said data processor for implementing a method comprising:
  determining the Fourier transform of an optical transfer function, $H_n(u,v)$, of said electro-optical imaging system;
  determining the Fourier transform of a spatial representation of the image, $G_n(u,v)$;
  determining the Fourier transform of a noise function of said electro-optical imaging system, $N_n(u,v)$;
  computing the Fourier transform of a Wiener kernel, $W_n(u,v)$, according to the relationship:

$$W_n(u,v) = \frac{1}{H_n(u,v)}\left(1 - \frac{N_n^2(u,v)}{G_n^2(u,v)}\right);$$

computing the Wiener kernel, $w_n(x,y)$, in the spatial domain by applying the inverse Fourier transform: $w_n(x,y)=F^{-1}(W_n(u,v))$, where $w_n(x,y)$ is subject to the constraint:

$$w_n(x_0, y_0) + \sum_{i,j=\lfloor -n/2 \rfloor}^{\lfloor n/2 \rfloor} w_n(x_i, y_j) = 1;$$

and
  applying the Wiener kernel in the spatial domain, $W_n(x,y)$, to said image.

24. The device of claim 23 wherein the step of the data processor determining the Fourier transform of an optical transfer function, $H_n(u,v)$, of said electro-optical imaging system, comprises:
 determining the modulation transfer function of said electro-optical imaging system, $MTF_n(u,v)$; and
 reconstructing the Fourier transform of an optical transfer function of said electro-optical imaging system, $H_n(u,v)$, with continuous derivatives from the modulation transfer function of said electro-optical imaging system using a continuity adjusted modulation transfer function approach.

25. The device of claim 24 wherein the step of the data processor reconstructing the Fourier transform of an optical transfer function of said electro-optical imaging system, $H_n(u,v)$, with continuous derivatives from the modulation transfer function of said electro-optical imaging system, comprises:
 assuming $H_n(u,v)$ to be separable such that $H(u,v)=H_u(u)H_v(v)$; defining $$H_u(u) = \begin{cases} MTF_u(u) & \text{if } u \in [0, u_1) \\ \prod_i^k \text{sign}(i)MTF(u) & \text{if } u \in [u_k, u_{k+1}), \ k=1,2,\ldots n \end{cases}$$

wherein $$\text{sign}(k) = \begin{cases} 1 & \text{if } \frac{dMTF_u(u_k^-)}{du} = \frac{dMTF_u(u_k^+)}{du} \\ -1 & \text{if } \frac{dMTF_u(u_k^-)}{du} \neq \frac{dMTF_u(u_k^+)}{du} \end{cases};$$

defining $H_v(v) =$ $$\begin{cases} MTF_v(v) & \text{if } v \in [0, v_1) \\ \prod_i^k \text{sign}(i)MTF(v) & \text{if } v \in [v_k, v_{k+1}), k=1,2,\ldots n \end{cases}$$

wherein $\text{sign}(k) = \begin{cases} 1 & \text{if } \frac{dMTF_v(v_k^-)}{dv} = \frac{dMTF_v(v_k^+)}{dv} \\ -1 & \text{if } \frac{dMTF_v(v_k^-)}{dv} \neq \frac{dMTF_v(v_k^+)}{dv} \end{cases};$ resampling $H_u(u)$ and $H_v(v)$ using conventional spline technique to match the kernel size n×n;
computing $H(u,v)=H_u(u)H_v(v)$.

26. The device of claim 23 wherein the step of the data processor determining the Fourier transform of an optical transfer function of said electro-optical imaging system, $H_n(u,v)$, where a substantially similar electro-optical imaging system is measurable, comprises:
 measuring the modulation transfer function of the substantially similar electro-optical imaging system;
 reconstructing the Fourier transform of an optical transfer function of the substantially similar electro-optical imaging system with continuous derivatives from the modulation transfer function of substantially similar electro-optical imaging system; and
 assuming the Fourier transform of an optical transfer function of said electro-optical imaging system is equivalent to the reconstructed Fourier transform of an optical transfer function of the substantially similar electro-optical imaging system.

27. The device of claim 23 wherein the step of the data processor determining the Fourier transform of an optical transfer function of said electro-optical imaging system, $H_n(u,v)$, comprises:
  assuming the optical transfer function is affected only by the optical characteristics of said electro-optical imaging system; and
  deriving the Fourier transform of an optical transfer function of said electro-optical transfer function based on the optical characteristics of said electro-optical imaging system.

28. The device of claim 23 wherein said data structure stores a Fourier transform of an optical transfer function of said electro-optical imaging system, $H_n(u,v)$, and said step of the data processor determining a Fourier transform of an optical transfer function of said electro-optical imaging system comprises the data processor retrieving the stored Fourier transform of an optical transfer function from said data structure.

29. The device of claim 23 wherein the step of the data processor determining the Fourier transform of a spatial representation of the image, $G_n(u,v)$, comprises:
  computing the discrete Fourier transform of a spatial representation of the whole image $G(u,v)$; and
  taking the first n frequencies, including both positive and negative frequencies, from $G(u,v)$ to produce an exact $G_n(u,v)$ across the whole image.

30. The device of claim 23 wherein the step of the data processor determining the Fourier transform of a spatial representation of the image, $G_n(u,v)$, comprises:
  generating k non-overlapping random sample windows in the image;
  computing a sampled $G_{n,k}(u,v)$ for each sample window;
  estimating $G_n(u,v)$ by averaging $G_{n,k}(u,v)$ across all sample windows according to the relationship:

$$G_n(u, v) = \frac{1}{k}\sum_k G_{n,k}(u, v).$$

31. The device of claim 23 wherein said data structure stores a Fourier transform of a noise function of said electro-optical imaging system, $N_n(u,v)$, and said step of the data processor determining a Fourier transform of a noise function of said electro-optical imaging system comprises the data processor retrieving the stored Fourier transform of a noise function from said data structure.

32. The device of claim 31 wherein the Fourier transform of a noise function of said electro-optical imaging system, $N_n(u,v)$, stored at said data structure is experimentally determined from the noise characteristics of the electro-optical imaging system.

33. The device of claim 31 wherein the Fourier transform of a noise function of said electro-optical imaging system, $N_n(u,v)$, stored at said data structure satisfies a Gaussian noise model.

34. The device of claim 23 wherein the step of the data processor determining the Fourier transform of a noise function of said electro-optical imaging system, $N_n(u,v)$, comprises assuming the Fourier transform of a noise function of said electro-optical imaging system relates to the Fourier transform of a spatial representation of the image, $G_n(u,v)$, according to the relationship:

$$N_n(u, v) = \min\left\{1, \min_{u,v}|G_n(u, v)|\right\}.$$

35. The device of claim 23 wherein the step of the data processor determining the Fourier transform of a noise function of said electro-optical imaging system, $N_n(u,v)$, comprises:
  selecting a reference target; and
  computing the Fourier transform of a noise function of said electro-optical imaging system, $N_n(u,v)$ based on the selected reference target.

36. The device of claim 23 wherein the step of the data processor computing the Fourier transform of a noise function of said electro-optical imaging system, $N_n(u,v)$, comprises:
  selecting a homogeneous region from the whole image; and
  computing the Fourier transform of a noise function of said electro-optical imaging system, $N_n(u,v)$, based on the selected homogeneous region.

37. A device for restoration of an image acquired by an electro-optical imaging system, comprising:
  a data processor in communication with said electro-optical imaging system; and
  a data structure in communication with said data processor, said data structure storing (a) a Fourier transform of an optical transfer function of said electro-optical imaging system, $H_n(u,v)$, (b) a Fourier transform of a noise function of said electro-optical imaging system, $N_n(u,v)$, and (c) instructions executable by said data processor for implementing a method comprising:
  determining the Fourier transform of a spatial representation of the image, $G_n(u,v)$;
  computing the Fourier transform of a Wiener kernel, $W_n(u,v)$, according to the relationship:

$$W_n(u, v) = \frac{1}{H_n(u, v)}\left(1 - \frac{N_n^2(u, v)}{G_n^2(u, v)}\right);$$

computing the Wiener kernel, $w_n(x, y)$, in the spatial domain by applying the inverse Fourier transform: $w_n(x, y) = F^{-1}(W_n(u,v))$, where $w_n(x,y)$ is subject to the constraint:

$$w_n(x_0, y_0) + \sum_{i,j=\lfloor -n/2 \rfloor}^{\lfloor n/2 \rfloor} w_n(x_i, y_j) = 1;$$

and applying the Wiener kernel in the spatial domain, $w_n(x,y)$, to said image.

38. The device of claim 37 wherein the Fourier transform of an optical transfer function, $H_n(u,v)$, of said electro-optical imaging system stored at said data structure comprises the Fourier transform of a substantially similar electro-optical imaging system reconstructed with continuous derivatives from the modulation transfer function of said substantially similar electro-optical imaging system.

39. The device of claim 37 wherein the step of the data processor determining the Fourier transform of a spatial representation of the image, $G_n(u,v)$, comprises:

computing the discrete Fourier transform of a spatial representation of the whole image G(u,v); and taking the first n frequencies, including both positive and negative frequencies, from G(u,v) to produce an exact $G_n(u,v)$ across the whole image.

40. The device of claim 37 wherein the step of the data processor determining the Fourier transform of a spatial representation of the image, $G_n(u,v)$, comprises:

generating k non-overlapping random sample windows in the image;

computing a sampled $G_{n,k}(u,v)$ for each sample window;

estimating $G_n(u,v)$ by averaging $G_{n,k}(u,v)$ across all sample windows according to the relationship:

$$G_n(u, v) = \frac{1}{k} \sum_k G_{n,k}(u, v).$$

41. The device of claim 37 wherein the Fourier transform of a noise function of said electro-optical imaging system, $N_n(u,v)$, stored at said data structure is experimentally determined from the noise characteristics of the electro-optical imaging system.

42. The device of claim 37 wherein the Fourier transform of a noise function of said electro-optical imaging system, $N_n(u,v)$, stored at said data structure satisfies a Gaussian noise model.

* * * * *